US011753079B2

(12) United States Patent
Grosse et al.

(10) Patent No.: US 11,753,079 B2
(45) Date of Patent: Sep. 12, 2023

(54) SIDE SILL FOR A MOTOR VEHICLE

(71) Applicant: Bayerische Motoren Werke Aktiengesellschaft, Munich (DE)

(72) Inventors: Ronny Grosse, Eichenau (DE); Marcus Raepple, Walpertskirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 185 days.

(21) Appl. No.: 17/298,705

(22) PCT Filed: Nov. 21, 2019

(86) PCT No.: PCT/EP2019/082082
§ 371 (c)(1),
(2) Date: Jun. 1, 2021

(87) PCT Pub. No.: WO2020/126291
PCT Pub. Date: Jun. 25, 2020

(65) Prior Publication Data
US 2022/0048574 A1 Feb. 17, 2022

(30) Foreign Application Priority Data
Dec. 20, 2018 (DE) ...................... 10 2018 133 049.9

(51) Int. Cl.
*B62D 25/02* (2006.01)
*B62D 27/02* (2006.01)
(Continued)

(52) U.S. Cl.
CPC ....... *B62D 25/025* (2013.01); *B62D 25/2036* (2013.01); *B62D 27/023* (2013.01); *B62D 29/007* (2013.01)

(58) Field of Classification Search
CPC .. B62D 25/025; B62D 27/023; B62D 27/026; B62D 27/065
(Continued)

(56) References Cited

U.S. PATENT DOCUMENTS 9,884,650 B2 * 2/2018 Blum ................... B62D 25/025
10,099,546 B2 * 10/2018 Hara ........................ B60K 1/04
(Continued)

FOREIGN PATENT DOCUMENTS

CN          101497305 A        8/2009
CN          104114438 A  *    10/2014  ........... B62D 21/152
(Continued)

OTHER PUBLICATIONS

English Translation of Chinese Office Action issued in Chinese Application No. 201980078480.4 dated Sep. 21, 2022 (eight (8) pages).
(Continued)

*Primary Examiner* — Dennis H Pedder
(74) *Attorney, Agent, or Firm* — Crowell & Moring LLP

(57) ABSTRACT

A side sill for a motor vehicle has a side-sill inner part assigned to a floor assembly, a bottom flange and a side-sill outer part which bounds a cavity of the side sill, in which a reinforcing part, which is fastened to the side-sill inner part, is arranged. In order to provide a side sill which is optimized in respect of simple manufacturing and installation and also needs-oriented design, and by which improved adaptability of the components to different construction variants is possible, the side-sill inner part and the bottom flange are designed as separate components which are connected to each other at least indirectly along a flange connection running in the direction of longitudinal extent of the side sill.

11 Claims, 9 Drawing Sheets

(51) Int. Cl.
  *B62D 25/20*  (2006.01)
  *B62D 29/00*  (2006.01)
(58) Field of Classification Search
  USPC .......................................... 296/209, 29, 30
  See application file for complete search history.

(56) References Cited

U.S. PATENT DOCUMENTS

| | | |
|---|---|---|
| 2009/0152034 A1 | 6/2009 | Takasaki et al. |
| 2012/0153682 A1 | 6/2012 | Rawlinson et al. |
| 2016/0244101 A1 | 8/2016 | Blum |
| 2016/0288636 A1 | 10/2016 | Kamimura et al. |
| 2018/0334022 A1 | 11/2018 | Rawlinson et al. |

FOREIGN PATENT DOCUMENTS

| | | |
|---|---|---|
| CN | 104176126 A | 12/2014 |
| CN | 208007099 U | 10/2018 |
| DE | 10 2007 032 245 A1 | 1/2009 |
| DE | 10 2010 062 748 A1 | 6/2012 |
| DE | 10 2011 077 810 A1 | 12/2012 |
| DE | 10 2014 018 324 A1 | 6/2015 |
| DE | 10 2015 100 256 A1 | 7/2016 |
| DE | 10 2015 203 309 A1 | 8/2016 |
| DE | 11 2014 005 490 T5 | 8/2016 |
| DE | 10 2016 220 239 B3 | 1/2018 |
| DE | 10 2016 223 492 B3 | 4/2018 |
| JP | 4-5177 A | 1/1992 |
| JP | 2017-226353 A | 12/2017 |

OTHER PUBLICATIONS

International Search Report (PCT/ISA/210) issued in PCT Application No. PCT/EP2019/082082 dated Feb. 17, 2020 with English translation (four (4) pages).

German-language Search Report issued in German Application No. 10 2018 133 049.9 dated Aug. 29, 2019 with partial English translation (11 pages).

* cited by examiner

SIDE SILL FOR A MOTOR VEHICLE

BACKGROUND AND SUMMARY OF THE INVENTION

The invention relates to a side sill for a motor vehicle. Furthermore, the invention relates to a modular system and to a method for producing a side sill of this type.

DE 10 2011 077 810 A1 has already disclosed a side sill for a passenger motor vehicle, which side sill comprises a side sill internal part which is connected to a floor assembly, a bottom flange and a side sill external part. Here, the side sill internal part and the bottom flange are formed from a substantially L-shaped and C-shaped sheet metal formed part, respectively. The side sill external part is likewise formed in a substantially L-shaped manner from a corresponding sheet metal formed part, respective flange connections running in the longitudinal direction of the side sill on its lower, outer corner or in an upper, central region. The arrangement of the lower flange connection on the lower outer corner results in the advantage that the bottom flange of the side sill can be pulled relatively far downward, which leads to a corresponding increase in the cross section of the side sill with the associated advantages in the case of static and dynamic loading.

A reinforcing part of approximately trapezoidal or cup-shaped cross section which is fastened to the side sill internal part is provided in the cavity of the side sill.

On account of its large-format configuration, however, the approximately L-shaped and C-shaped sheet metal component which forms the side sill internal part and the bottom flange, respectively, is relatively complicated to produce and/or is limited in terms of the selection of the possible materials which can be used. More precisely, some materials, for example extremely high strength steels, cannot be readily used for this sheet metal component, since there is a certain risk of cracking on account of the high degrees of reshaping. It is a further problem that a large-format component of this type can be adapted only with difficulty to different design variants which result, in particular, from varying drive concepts (vehicle with internal combustion engine, drive or electric drive). Even distinctions which are specific to the design variant with regard to the derivatives within a model series which result, for example, from the distinction between relatively flat designs in the case of coupes or cabrios in comparison with relatively high designs in the case of limousines or SUVs and vans can be taken into consideration by way of a large-format component of this type only with difficulty.

Since, moreover, the sheet metal component (which forms the side sill and the bottom flange) according to the prior art is of undercut configuration in the vehicle vertical direction (z-direction) in the assembly direction which runs parallel to the vehicle transverse direction (y-direction), relatively complicated assembly additionally results in the case of the assembly of respective fastening sockets for an energy store on the side sill, in the case of which relatively complicated assembly, for example, the reinforcing component has to be cut out and therefore weakened in the region of the respective fastening sockets.

Therefore, it is an object of the present invention to provide a side sill, a modular system and a method for producing a side sill of this kind of the type mentioned at the outset, by means of which an improved adaptability of the components to different design variants of the side sill can be realized with regard to simple manufacture and assembly and needs-based design.

According to the invention, this object is achieved by way of a side sill, a modular system, and a method for producing a side sill of this type, in accordance with the independent claims. Advantageous refinements are the subject matter of the respective dependent claims.

In order to achieve simple manufacture and assembly and in order to achieve a favorable needs-based design, the side sill according to the invention which comprises a side sill internal part which is assigned to a floor assembly, a bottom flange and a side sill external part, by way of which a cavity is delimited, in which a reinforcing part is arranged which is fastened to the side sill internal part is distinguished by the fact that the side sill internal part and the bottom flange are configured as separate components which are connected to one another at least indirectly along a flange connection which runs in the direction of longitudinal extent of the side sill. Accordingly, it is provided according to the invention for the component which has been in one piece up to now consisting of the side sill internal part and the bottom flange to now be configured in two pieces, and for the two components to be connected to one another at least indirectly along a flange connection which runs in the direction of longitudinal extent of the side sill, possibly by means of a further component such as, for example, the reinforcing part. This has the advantage first of all that the side sill internal part and the bottom flange can be produced in a simpler and more needs-based manner. In this way, in particular, the risk of crack formation in the region of the bottom flange during the production thereof, in particular during the reshaping thereof, is reduced considerably. In this way, moreover, different materials can be used for the side sill internal part and the bottom flange, in order to be adapted to the respective loads in a more needs-based manner. It is thus possible, for example, for extremely high strength steels to be used in the case of the side sill internal part, whereas materials which are more ductile in comparison can be used, for example, in the case of the bottom flange.

A further advantage results, in particular, in the case of the use of the side sill in motor vehicles with different drive concepts, in particular in motor vehicles with a pure electric drive, a hybrid drive or a drive by way of an internal combustion engine. Here, in the case of the side sill according to the invention, the side sill internal part can be produced in a manner which is universal across design variants, and can be assigned to the floor assembly as an identical part, it being possible for the bottom flange to be adapted in a simple way in a manner which is specific to the design variant to the respective requirements which vary in the case of the respective drive concepts. Here, in particular, it can be taken into consideration that, in the case of vehicles with an underfloor energy store, the side sill has to be of considerably more complicated design in the region of the bottom flange, on account of the fastening of this underfloor energy store, than, for example, in the case of a vehicle with an internal combustion engine.

For example and in particular, it is possible, in the case of the use of the side sill in a vehicle with an underfloor energy store, for the bottom flange to be configured as a structural unit which can be preassembled in a manner which is specific to the design variant, in order, as a result, firstly to facilitate the manufacture and assembly, and secondly to achieve a needs-based embodiment, since, in this way, for example, respective connecting elements of the side sill with the energy store can be designed without an undercut as a consequence of the assembly sequence or as a consequence of the joint direction, with the result that, for example, the reinforcing part does not have to be cut out. In addition, improved and/or simpler tolerance chains can also be achieved, since all the relevant components are arranged on the side of the bottom flange or the associated structural unit in the case of the attachment of an energy store. Different vehicle ride heights which result, for example, in the case of limousines, SUVs or vans firstly and coupes, cabriolets or the like with a flatter design secondly can also be taken into consideration in a more needs-based manner by way of the splitting in two of this component into the side sill internal part and the bottom flange.

In a further refinement of the invention, it has been shown to be advantageous here if the bottom flange and the reinforcing part are configured as a structural unit which can be preassembled and is specific to the design variant. Accordingly, as part of the floor assembly, the side sill internal part can be configured in a simple way in a manner which is universal across design variants, whereas, as parts of a structural unit which can be preassembled, the bottom flange and the reinforcing part are adapted specifically to one design variant of the motor vehicle. Thus, for example, a structural unit consisting of a bottom flange and a reinforcing part can be produced for a vehicle with an underfloor energy store, which structural unit is supplemented, for example, by corresponding connecting elements for the attachment of the energy store to the side sill, whereas a structural unit can be produced for a motor vehicle with an internal combustion drive, which structural unit is of simplified configuration in comparison. In this way, the side sill overall can be adapted in a simple way to a respective design variant of the motor vehicle, respective design variants relating, in particular, to the drive concept, but possibly also, for example, to the vehicle ride height of the vehicle (limousines, SUVs, van, coupe, cabriolet, etc.).

A further advantageous embodiment of the invention provides that the bottom flange and the reinforcing part are connected to one another via a plurality of connecting elements of the structural unit which can be preassembled. Therefore, not only can the reinforcing part and the bottom flange be preassembled, but rather they can also be connected to one another in a correspondingly stable and rigid manner, with the result that considerable forces, for example static and dynamic bending and/or torsional forces which act on the side sill, can be absorbed by way of the structural unit.

In a further advantageous refinement of the invention, the respective connecting elements are configured in two pieces with respective joining regions, along which the length of the connecting elements can be set. The two-piece configuration of the connecting elements achieves, in particular, the adjustability in the vehicle vertical direction (z-direction), with the result that a particularly satisfactory adaptability of the connecting elements can be realized.

Here, in a further preferred refinement of the invention, the respective connecting elements are formed, in particular, from a fastening socket for an energy store of the motor vehicle and from a supporting element, in particular a bulkhead plate, which can be displaced or adjusted relative to one another at least in the vehicle vertical direction (z-direction), and can subsequently be connected to one another, for example, by way of spot welding, laser welding or another joining method, possibly also a mechanical connecting method. As a result of the adjustability of the connecting elements, therefore, the fastening sockets, to which the underfloor energy store is fastened, can be attached via the associated supporting elements, in particular the bulkhead plate, in a simple way over a considerable height extent direction and, in particular, to the associated reinforcing part of the side sill. Here, tolerances can be compensated for in a particularly simple way by way of the adjustability of the connection between the respective connecting element and the associated supporting element.

It is provided in a further preferred embodiment of the invention that the bottom flange has a reference element, in particular a fitting opening, for orienting an energy store. According to the invention, accordingly, all the structural elements which are required for the orientation of the energy store relative to the side sill, namely both the fitting opening or reference element or the like and the connecting elements for fixing the energy store on the associated side sill, are therefore arranged on the side of the bottom flange. This makes a reduction of the tolerance chains in an optimum way possible.

A further advantageous refinement of the invention provides that the side sill internal part is configured as an identical part which is universal across design variants. This results firstly in a particularly simple production of the side sill internal part itself, but also a simple design of the floor assembly, to which the side sill internal part which is universal across design variants is fastened.

In addition, it has been shown to be advantageous if the side sill internal part and the bottom flange are connected to one another by means of the reinforcing part. In this way, the bottom flange and the reinforcing part can be connected to one another during the preassembly of the structural unit, the reinforcing part then serving, in the case of the connection of the structural unit to the side sill internal part, to connect the bottom flange indirectly to the side sill internal part.

A further advantageous embodiment of the invention provides that the side sill internal part and the bottom flange are formed from different materials, the side sill internal part being formed, in particular, from a high strength or extremely high strength steel, and the bottom flange being formed, in particular, from a material which is more ductile in comparison. As a result, in particular, it can be taken into consideration that the two parts are subjected to different static and dynamic loads and different requirements in terms of manufacturing technology.

In this context, it has been shown to be advantageous in a further refinement of the invention if the side sill internal part is formed from a galvanized component which is press-hardened with direct warm reshaping. This is possible by virtue of the fact that the side sill internal part is configured separately from the bottom flange and accordingly has a simpler geometric shape which permits a method of this type. Here, in comparison with other, similar methods, reshaping and final trimming can be dispensed with, in particular, whereas warm trimming takes place in the case of warm reshaping and hardening, and end trimming by way of laser. The described method, in the case of which the side sill internal part is press-hardened with direct warm reshaping, has the advantage here of a loading-adequate design of the component, a high degree of material utilization, and less expensive production in comparison with conventional methods.

The advantages which are mentioned above in conjunction with the side sill according to the invention apply likewise to the modular system according to the invention. This modular system is distinguished, in particular, by the use of a side sill internal part which is universal across design variants and is assigned to the floor assembly, and of a plurality of bottom flanges which are specific to the design variant and are adapted, in particular, to the respective drive concept of the motor vehicle. As a result, in particular, it can be taken into account that, for example, a purely electrically operated vehicle with an accordingly large underfloor energy store requires corresponding attachment points on the bottom flange which are not required in the case of other vehicle variants, for example vehicles which are operated purely by way of fuel. To this extent, the division of the side sill in this region into the side sill internal part which is universal across design variants and the plurality of bottom flanges which are specific to the design variant has the advantage that the bottom flange can be adapted specifically in a particularly advantageous way.

Here, the bottom flange which is specific to the design variant is preferably part of a structural unit which is specific to the design variant and, moreover, comprises the reinforcing part which is accommodated in the cavity of the side sill. It is to be taken into consideration here that the reinforcing part can therefore also be configured in a manner which is specific to the design variant and/or can be connected to the bottom flange, in order in this way to achieve an ideal adaptation to the respective design variant of the motor vehicle. Here, the respective structural unit which is specific to the design variant can be preassembled in a simple way and can be fed into the manufacturing process, for example within the context of the production of the shell of the respective motor vehicle.

One advantage of the connection of the bottom flange to the reinforcing part can be realized here in a further refinement of the invention by virtue of the fact that these components can be preassembled via a plurality of connecting elements to form the structural unit which is specific to the design variant. These connecting elements can be, for example, respective fastening sockets for an energy store of the motor vehicle and respective associated supporting elements, in particular bulkhead plates, which can be joined to one another on respective joining regions, along which the length of the connecting elements can be set. The great advantage of a structural unit of this type which is specific to the design variant is to be seen, in particular, in the fact that therefore the bottom flange and the associated reinforcing part can be joined without it being necessary, in particular, for the reinforcing part to be cut out in the region of the respective connecting elements. This would be the case namely if the reinforcing part were configured separately from the connecting elements and were then fastened to the side sill internal part in the vehicle transverse direction (y-direction). If the side sill internal part and the bottom flange are namely designed in one piece as an L-shaped sheet metal component, subsequent assembly of the reinforcing part on the side sill internal part in the case of the presence of respective reinforcing parts between the bottom flange and the reinforcing part can take place only by virtue of the fact that the reinforcing part is cut out correspondingly in the region of the connecting elements, since joining can otherwise no longer take place in the vehicle transverse direction (y-direction).

The advantages which are mentioned above in conjunction with the side sill according to the invention and the modular system according to the invention also apply to the method for producing a side sill of this type.

Further features of the invention result from the claims, the figures and the description of the figures. The features and combinations of features mentioned above in the description and the features and combinations of features mentioned in the following text in the description of the figures and/or shown solely in the figures can be used not only in the respective specified combination, but rather also in other combinations or on their own.

The invention will now be described in greater detail on the basis of one preferred exemplary embodiment and with reference to the drawings.

DETAILED DESCRIPTION OF THE DRAWINGS

Figure 1:
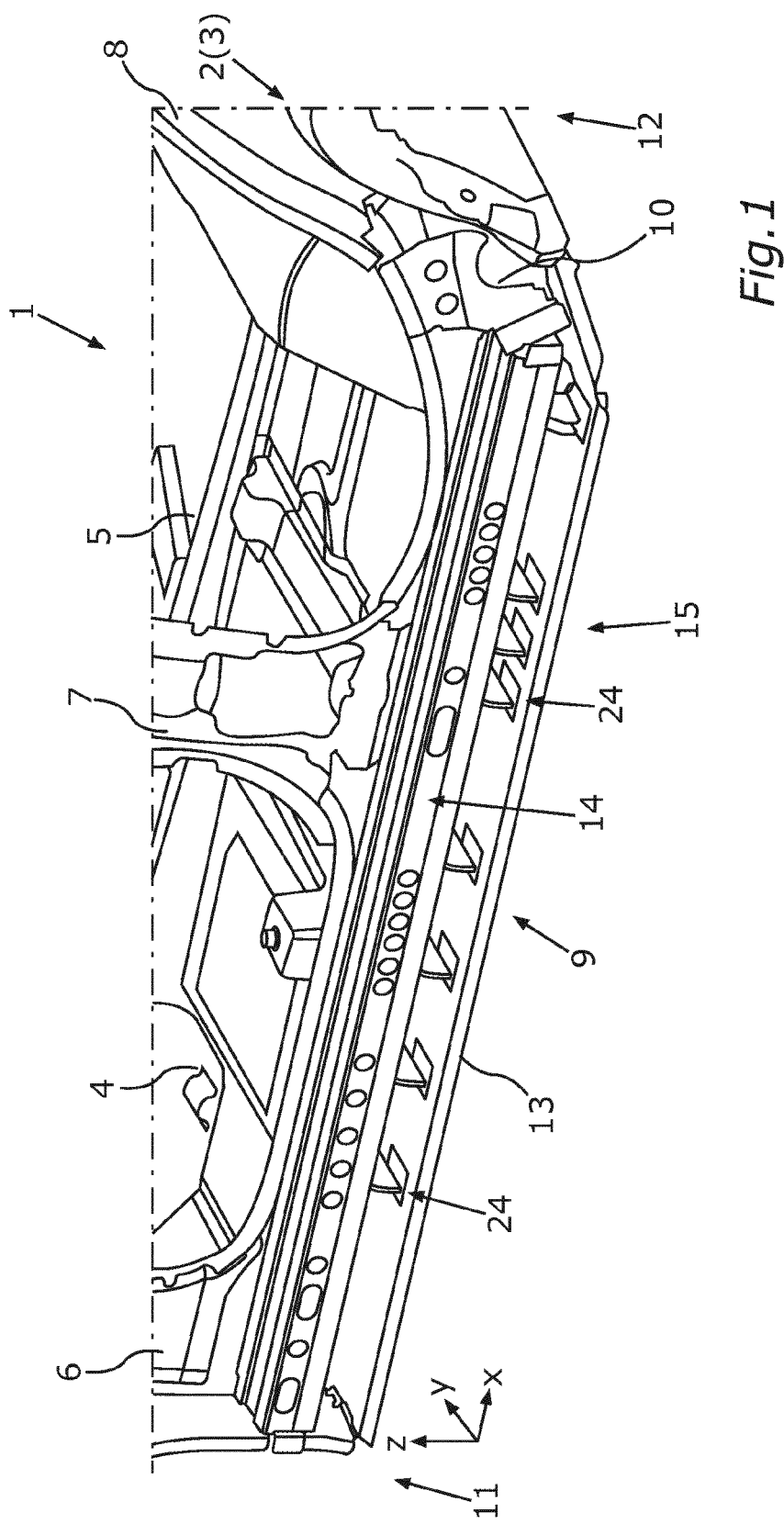
FIG. 1 shows details of a perspective view of a vehicle body of a passenger motor vehicle in the region of a partially shown side sill according to the invention which comprises a side sill internal part which is assigned to a floor assembly and a structural unit which can be preassembled and is specific to the design variant with a bottom flange and a reinforcing part which, in the present embodiment which is specific to the design variant, are connected to one another via a plurality of connecting elements which comprise respective fastening sockets for fastening an energy store of the motor vehicle and associated bulkhead plates which can be set in the vehicle vertical direction in terms of their relative position to one another and can be connected to one another.

FIG. 1 shows details of a perspective view of a vehicle body of a passenger motor vehicle, of which, in particular, a floor assembly 1 can be seen, on the outer side of which a side wall 2 is arranged which extends in the vehicle longitudinal direction (x-direction) and in the vehicle vertical direction (z-direction) and of which, however, only an inner side wall part 3 can be seen in the present case. This inner side wall part 3 is adjoined on the outer side by a central and an outer side wall part. A front and a rear door opening 4, 5 can be seen in the side wall 2 or the side wall part 3, as can door pillars in the form of an A-pillar 6, a B-pillar 7 and a C-pillar 8.

A side sill 9 can be seen in part on the left-hand (as viewed in the forward driving direction) vehicle side, which side sill 9 extends at least substantially between a front wheel arch 11 and a rear wheel arch 12. Here, the side sill 9 comprises a side sill internal part 10 which in the present case extends at least substantially likewise from the front wheel arch 11 as far as the rear wheel arch 12 and in the present case is fastened to the floor assembly 1 or the inner side wall part 3 of the side wall 2.

Moreover, the side sill 9 comprises a bottom flange 13 which delimits it toward the bottom in the vehicle vertical direction (z-direction) and extends approximately horizontally in the vehicle transverse direction (y-direction) and in the vehicle longitudinal direction (x-direction), and a reinforcing part 14 of approximately cup-shaped cross section which is received in a way which will be described in greater detail in the further text in a cavity which is formed by way of the side sill 9. Here, the bottom flange 13 is configured separately from the side sill internal part 10 in a way which will be described in greater detail in the further text, and is connected to the side sill internal part 10 along a flange connection which runs in the direction of longitudinal extent of the side sill 9 by means of the reinforcing part 14. Moreover, the bottom flange 13 and the reinforcing part 14 form a structural unit 15 which can be preassembled, is specific to the design variant, is described in greater detail with reference to FIGS. 2a to 2c, is initially produced separately from the floor assembly 1, and is subsequently fastened to the floor assembly 1 or to the side sill internal part 10.

Figure 2A:
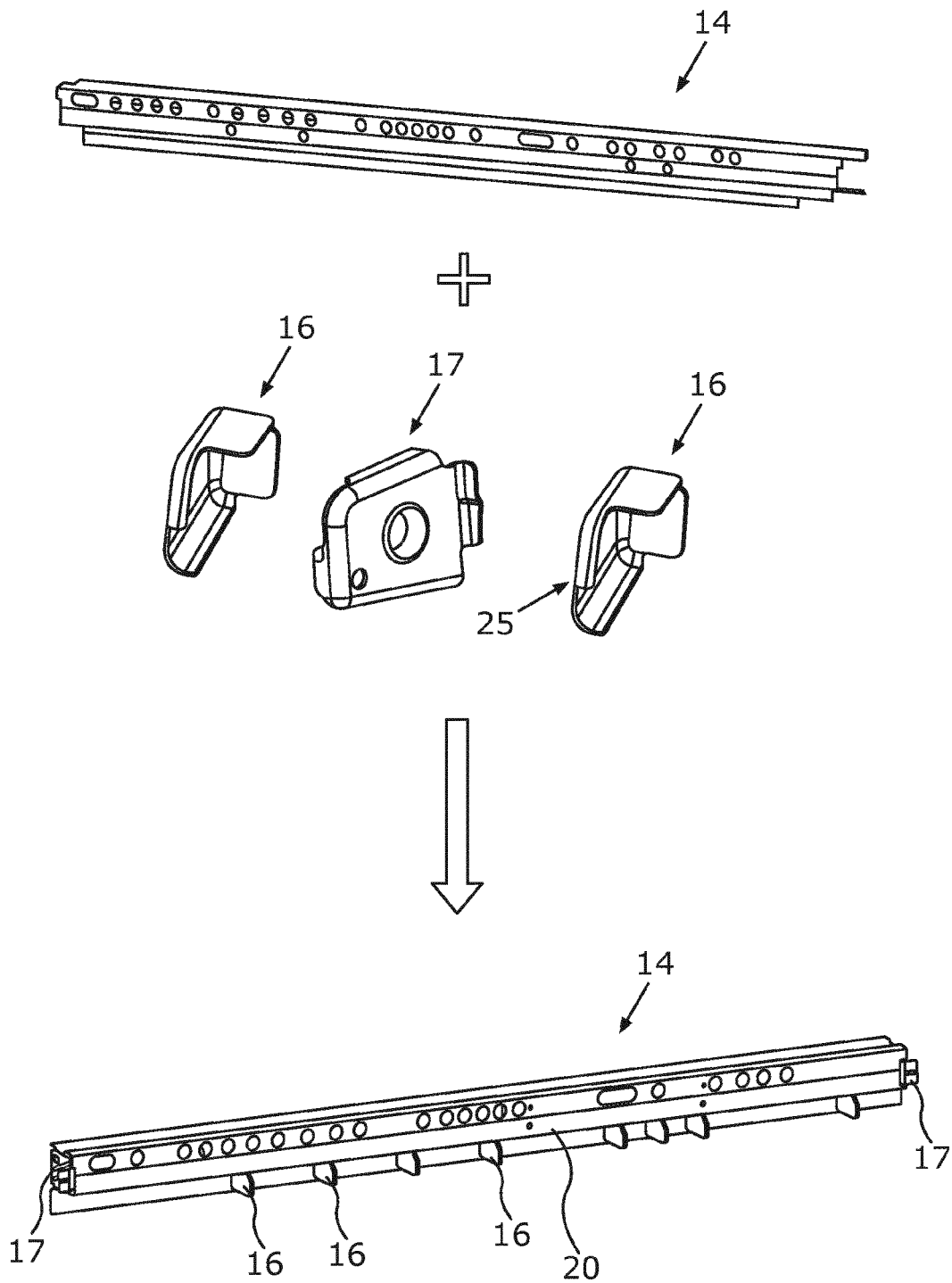
FIG. 2a shows respective perspective illustrations of the diagrammatic explanation of a first manufacturing step for producing the structural unit which can be preassembled according to FIG. 1, in which first manufacturing step respective bulkhead plates are connected to the reinforcing part.

In the further text, the assembly of the structural unit 15 which can be preassembled and is specific to the design variant will now be described on the basis of FIGS. 2a to 2c:

In this regard, FIG. 2a shows a respective perspective view of the reinforcing part 14 and respective bulkhead plates 16, 17 which, as is indicated in FIG. 2a, are connected to the reinforcing part 14, for example, by way of spot welding, laser welding or a similar joining method, possibly also by means of a mechanical connection. Here, the bulkhead plates 16 are arranged on the reinforcing part 14 in a manner which is distributed over the direction of longitudinal extent, to be precise in a corner region between a vertically running wall region 19 and a substantially horizontally running wall region 20. The bulkhead plates 17 form a respective front and rear termination of the side sill 9. In the front and rear region of the side sill 9, in particular, jacking points can possibly also be fastened. The reinforcing part 14 is produced, for example, by roll forming.

Figure 2B:
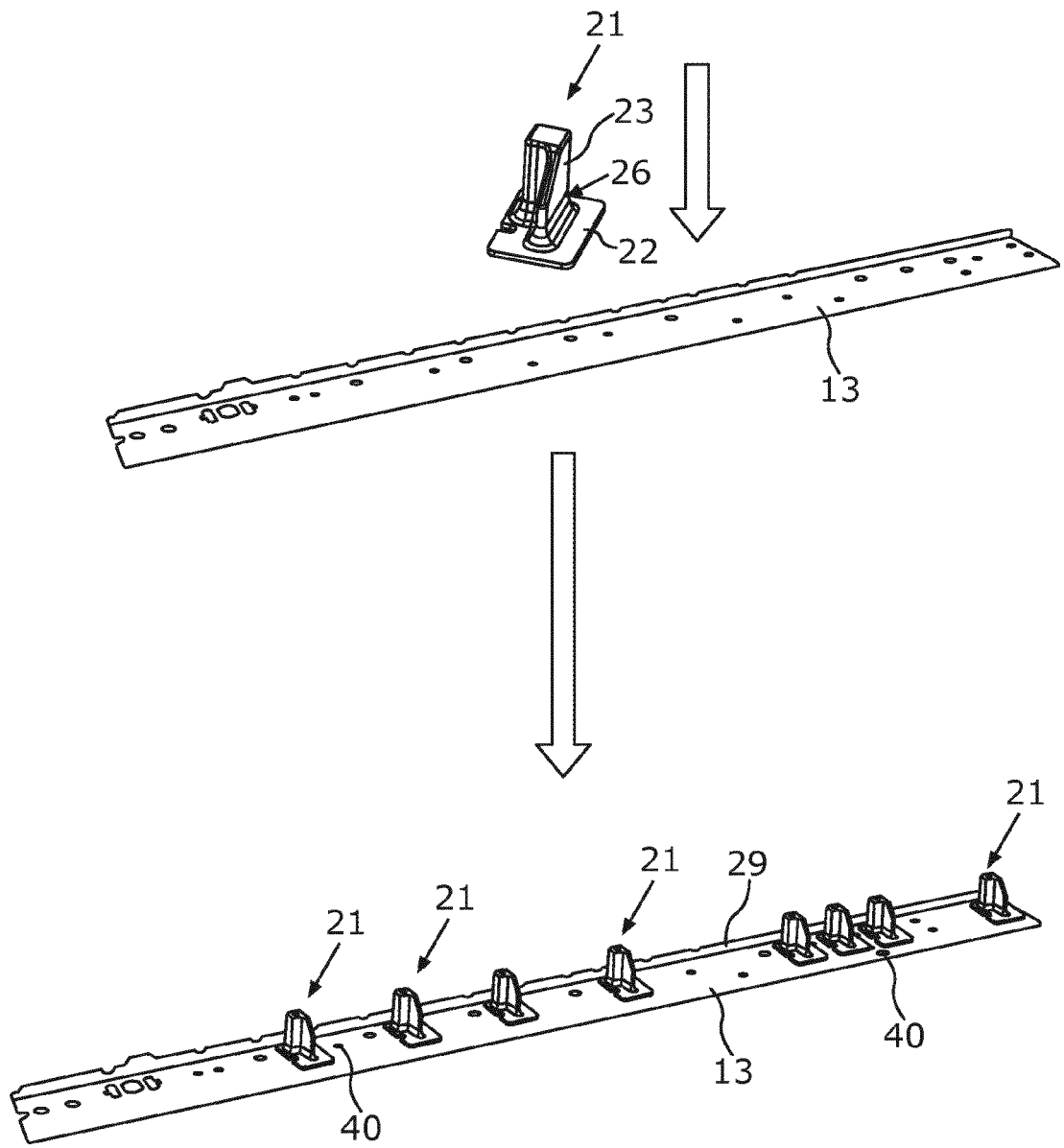
FIG. 2b shows respective perspective illustrations of the diagrammatic explanation of a further method step for producing the structural unit which can be preassembled according to FIG. 1, in which further method step respective fastening sockets are provided for fastening an underfloor energy store to the motor vehicle, which fastening sockets are fastened on the upper side of the bottom flange of the structural unit which can be preassembled.
Figure 2C:
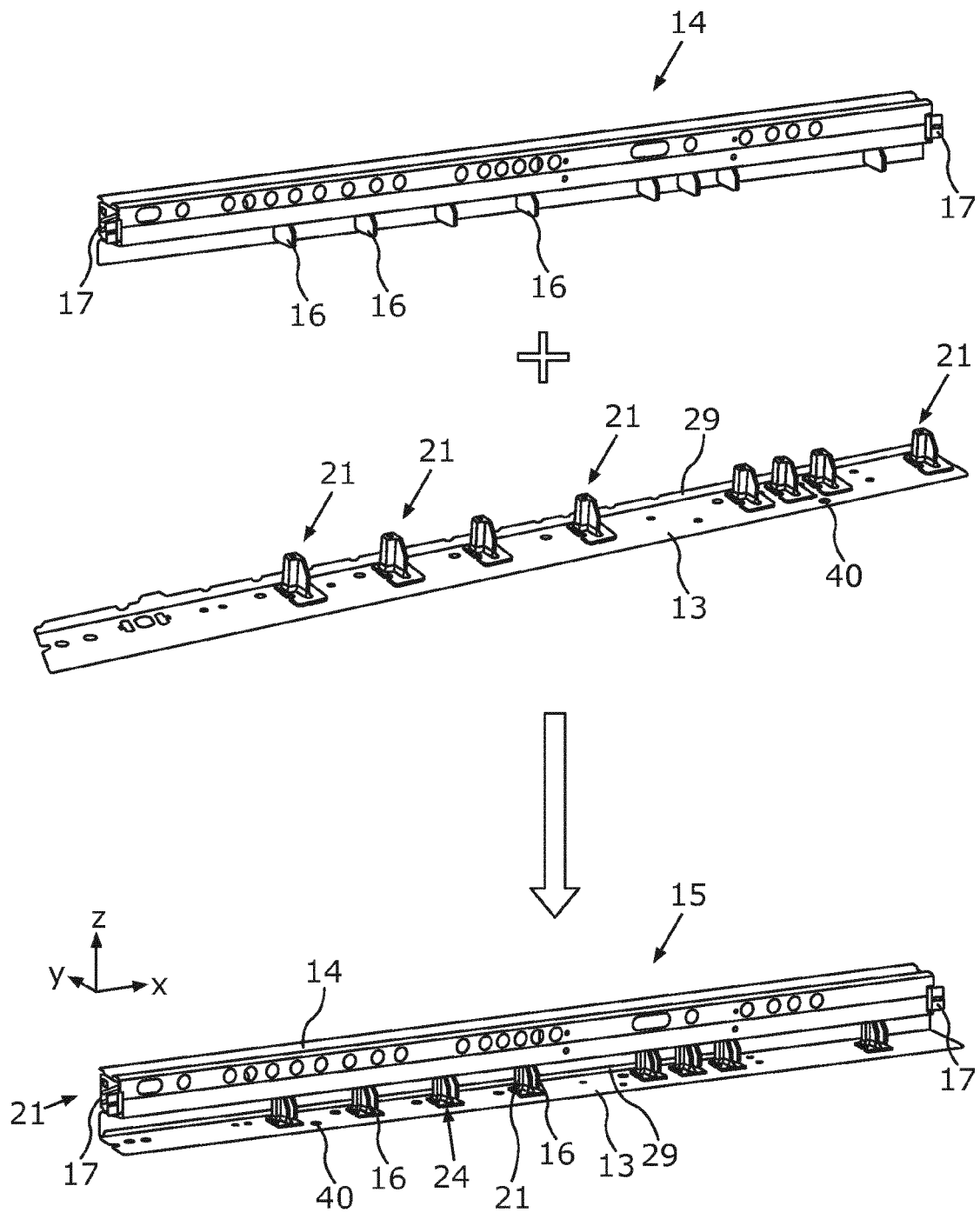
FIG. 2c shows respective further perspective views of the reinforcing part with the bulkhead plates according to FIG. 2a and the bottom flange with the fastening sockets according to FIG. 2b which are connected to one another in a further method step to form the finished structural unit which can be preassembled.

FIG. 2b shows respective perspective illustrations of the diagrammatic explanation of a further method step for producing the structural unit which can be preassembled according to FIG. 1, in which further method step respective fastening sockets 21 are provided for fastening an underfloor energy store to the motor vehicle, which fastening sockets 21 are fastened above the bottom flange 13 of the structural unit 15 which can be preassembled, for example by way of spot welding. Here, the fastening sockets 21 are produced by way of cold extrusion, and comprise a head 22 and a shank 23 which is connected in one piece to the former. A threaded hole 39 (FIG. 7) is made in the respective fastening socket 21, in which threaded hole 39 a screw 38 (FIG. 7) for fastening the energy store 37 (FIG. 7) can be fixed. This threaded hole 39 is arranged so as to overlap with an opening within the bottom flange 13.

FIG. 2c shows respective further perspective views of the reinforcing part 14 with the bulkhead plates 16, 17 according to FIG. 2a and of the bottom flange 13 with the fastening sockets 21 according to FIG. 2b, which are connected to one another in a further method step to form the finished structural unit which can be preassembled. Here, the bulkhead plates 16 on the side of the reinforcing part 14 and the associated fastening sockets 21 on the side of the bottom flange 13 are connected to one another by way of spot welding, possibly also by way of another joining method. Each pair, consisting of the corresponding bulkhead plate 16 and the associated fastening socket 21, forms a connecting element 24 here, via which the reinforcing part 14 and the bottom flange 13 are connected to one another. Accordingly, the bottom flange 13 and the reinforcing part 14 are connected to one another via a plurality of connecting elements 24 of the structural unit 15 which can be preassembled.

Figure 6:
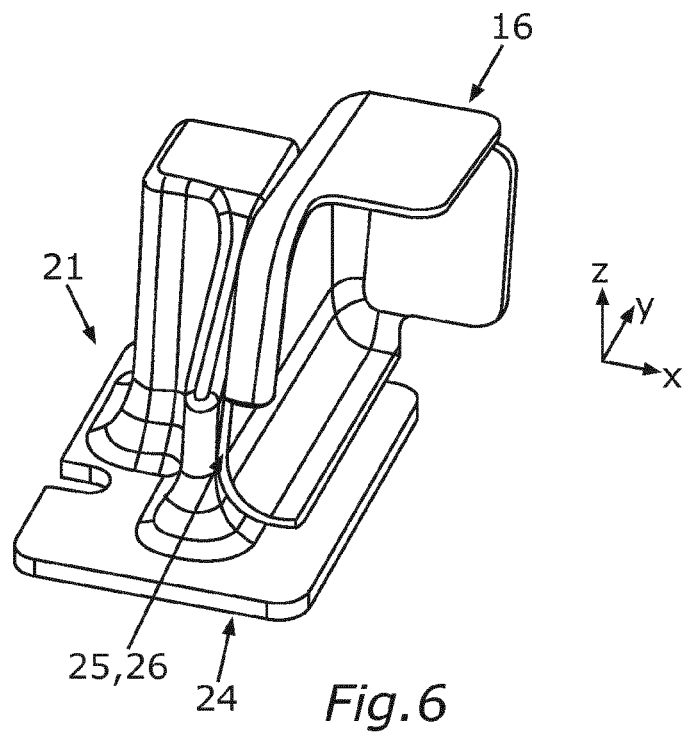
FIG. 6 shows a perspective view of a two-piece connecting element which is formed from the respective fastening socket and the associated bulkhead plate and via which the bottom flange and the reinforcing part are connected to one another.

In combination with FIG. 6 which shows a perspective view of a two-piece connecting element 24 which is formed from the respective fastening socket 21 and the associated bulkhead plate 16 and via which the bottom flange 13 and the reinforcing part 14 are connected to one another, it can be seen that both the respective bulkhead plate 16 and the associated fastening socket 21 in each case have a joining region 25, 26 which have or are configured as a surface which extends in each case vertically in the vehicle vertical direction (z-direction) and in the vehicle transverse direction (y-direction). Here, their position relative to one another, in particular in the vehicle vertical direction (z-direction) but also in the vehicle transverse direction (y-direction), of the respective bulkhead plates 16 and the associated fastening sockets 21 can be set in their relative position along these surfaces or joining regions 25, 26. After this setting operation, joining of the bulkhead plate 16 and the associated fastening socket 21 then takes place, for example, by way of spot welding. These method steps all take place within the context of the preassembly of the structural unit 15.

Moreover, the bottom flange 13 and the reinforcing part 14 are also connected to one another directly, namely along a flange connection 27 which runs in the direction of longitudinal extent of the side sill. Here, the respective flanges are connected by way of laser welding, other joining methods also being conceivable.

Figure 3:
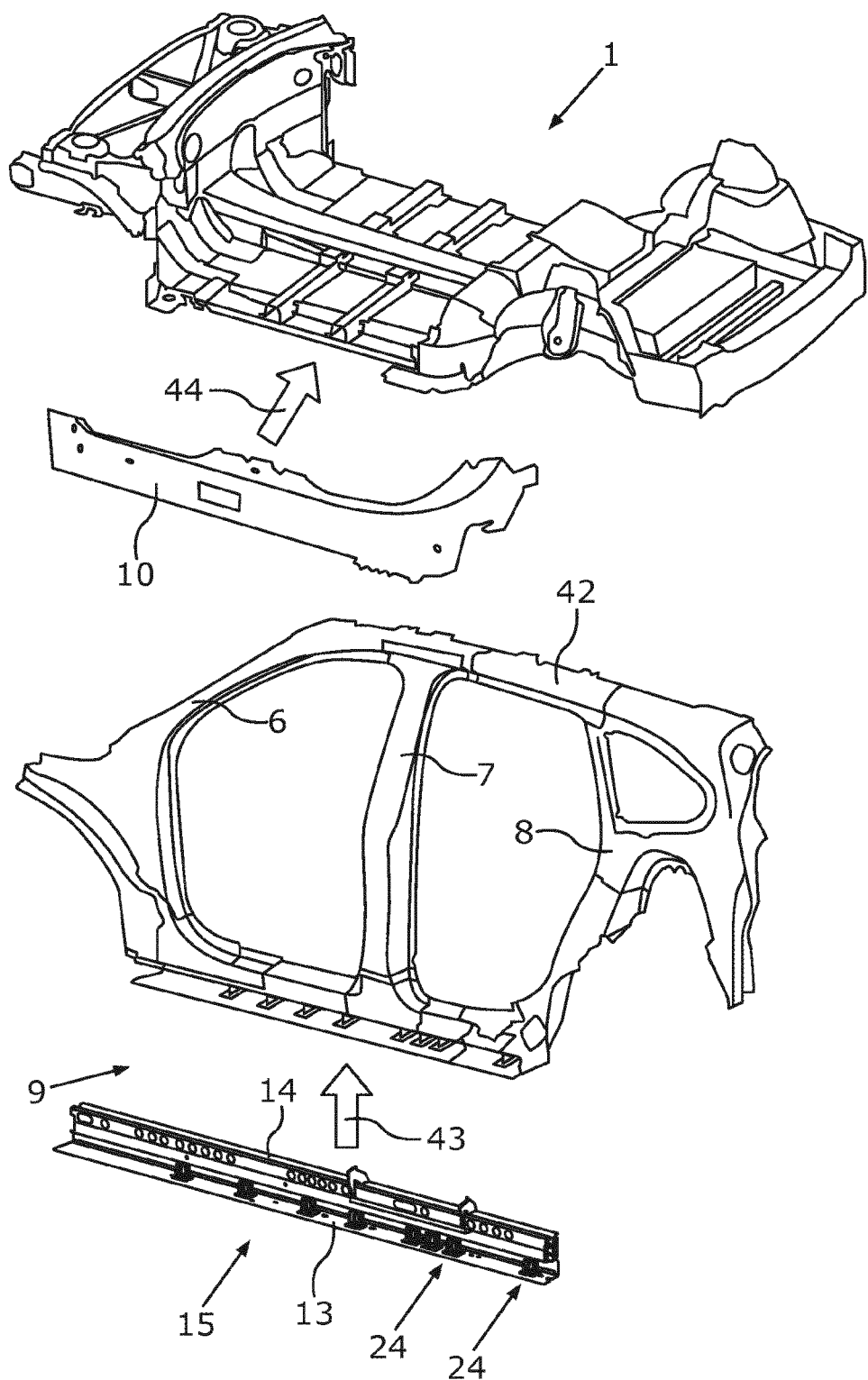
FIG. 3 shows a perspective exploded illustration of the assembly of the prefabricated structural unit which is specific to the design variant with a central side wall part which is subsequently connected to the side sill internal part which is arranged on the side of the floor assembly.

It can be seen on the basis of the perspective exploded illustration from FIG. 3 (at the top) that the side sill internal part 10 is welded to the floor assembly 1 within the context of the shell manufacturing. In accordance with the illustration in FIG. 3 (at the bottom), the prefabricated structural unit 15 which is specific to the design variant is initially connected to a side frame center 42 in accordance with the arrow 43, after which the side frame center 42 is connected on the inner side to a side frame interior (not shown here) and a side frame exterior (likewise not shown). Therefore, the side frame center 42, the side frame interior and the side frame exterior, which in each case can be configured in one piece or in multiple pieces, form the side frame or the side wall of the vehicle body. Here, the side frame exterior forms the side sill external part 41 which can be seen in FIG. 7, in the region of the side sill 9.

Subsequently, the side frame with the structural unit 15 is fastened to the floor assembly 1 with the side sill internal part 10.

Figure 4:
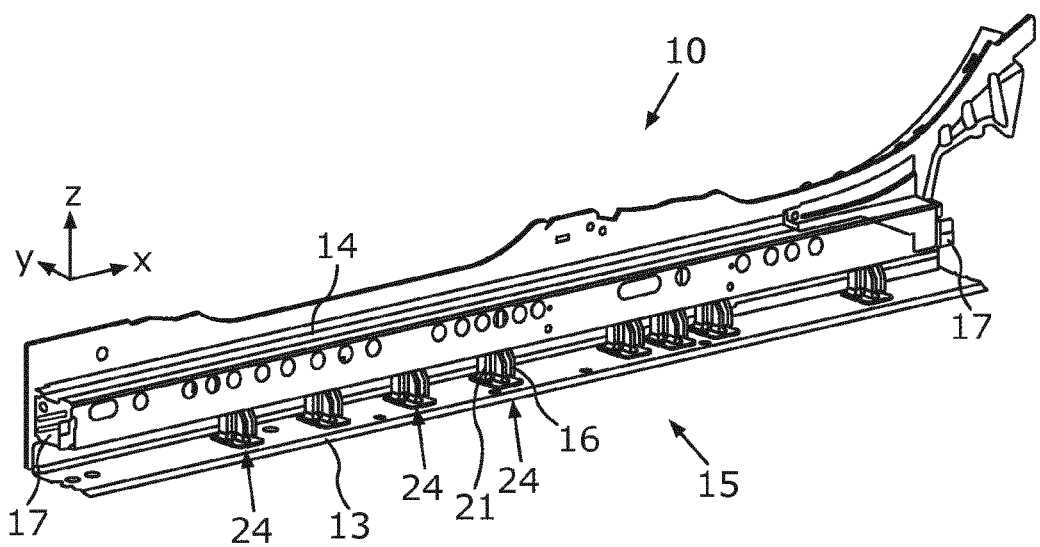
FIG. 4 shows details of a perspective view of the assembly of the prefabricated structural unit which is specific to the design variant with the side sill internal part which is arranged fixedly on the side of the floor assembly and is connected indirectly to the bottom flange of the structural unit along a flange connection which runs in the direction of longitudinal extent of the side sill, by means of the reinforcing part.

FIG. 4 shows details of a perspective view of the assembly of the prefabricated structural unit 15 which is specific to the design variant with the side sill internal part 10 which is arranged fixedly on the side of the floor assembly 1, once again in a separate manner.

Figure 5:
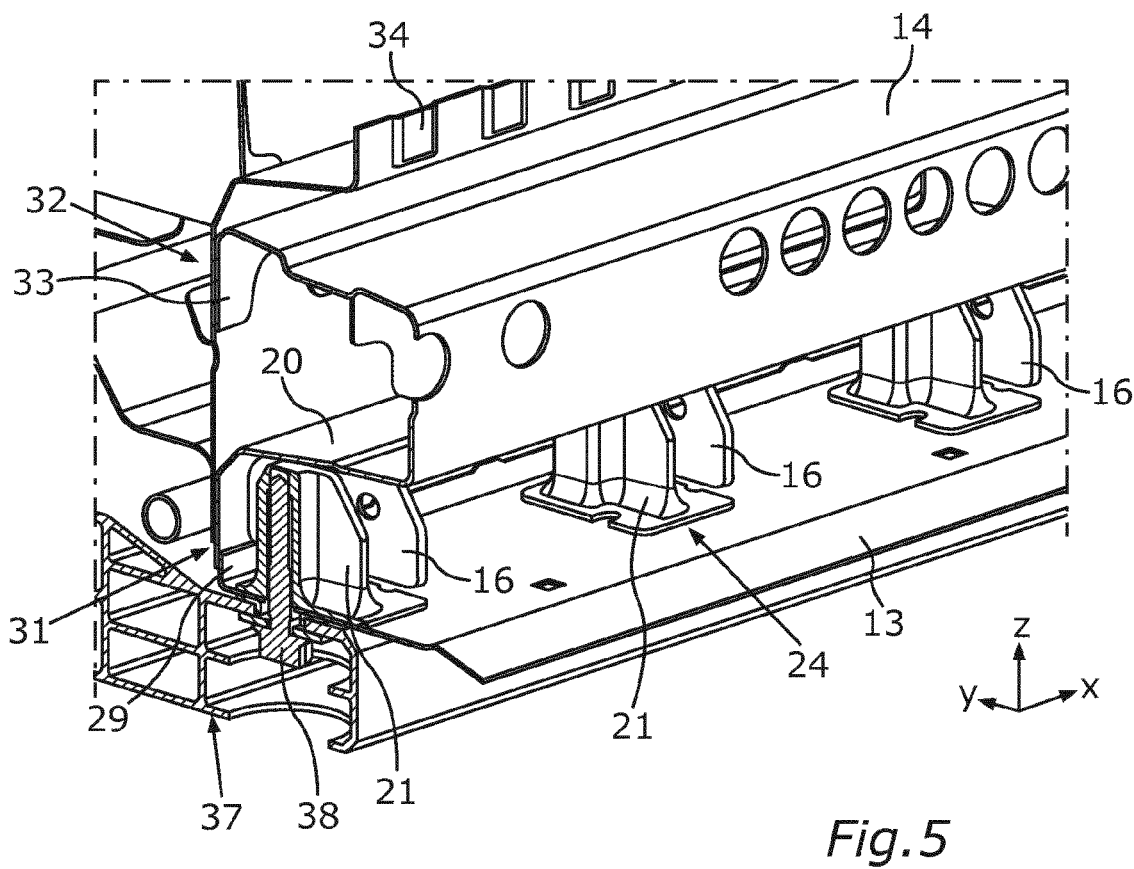
FIG. 5 shows a perspective sectional view (greatly enlarged in comparison with FIG. 4) of the partially shown side sill, an underfloor energy store for an electric drive of the motor vehicle being fastened, moreover, on the underside of the side sill.
Figure 7:
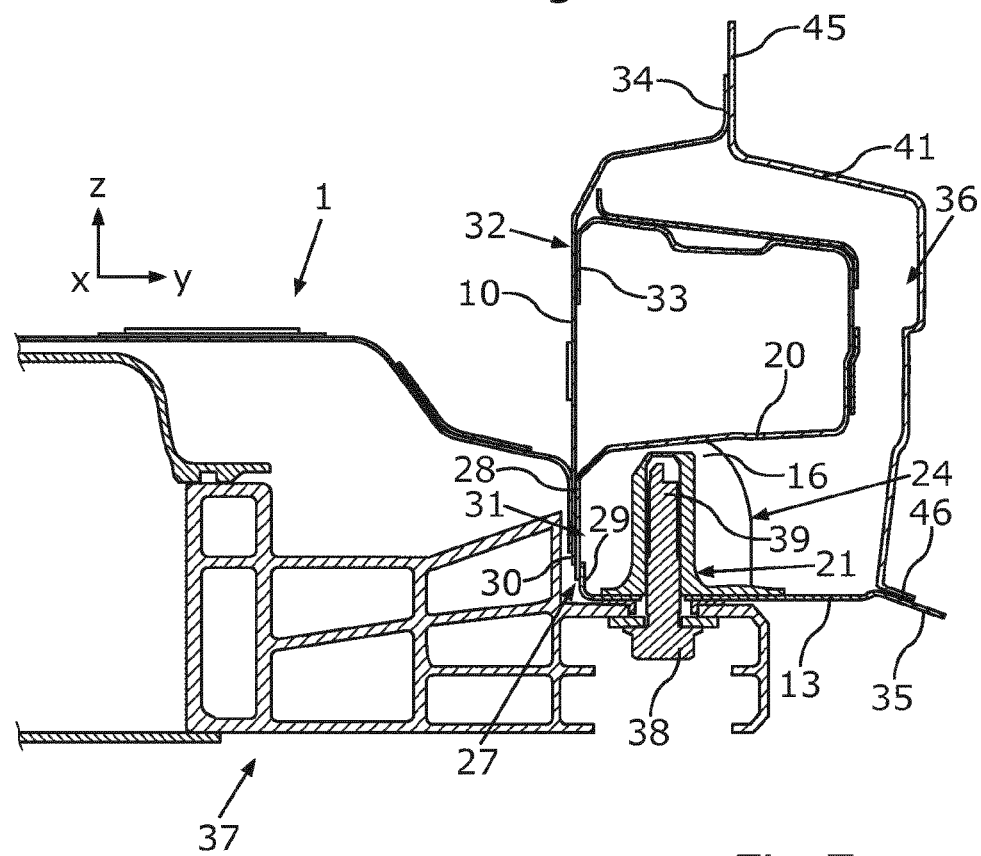
FIG. 7 shows details of a sectional view through the side sill according to FIGS. 1 to 5 with the underfloor energy store which is fastened thereto.

In combination with FIG. 5 which shows a perspective sectional view (enlarged greatly in comparison with FIG. 4) of the partially shown side sill 9, and/or in combination with FIG. 7 which shows a sectional view from the front of the complete side sill 9, it can be seen, in particular, that the bottom flange 13 is connected indirectly to the side sill internal part 10 by means of the reinforcing part 14. This indirect connection between the bottom flange 13 and the side sill internal part 10 takes place, in particular, via a lower flange 28 (which can be seen in FIGS. 5 and 7) of the reinforcing part 14 of cup-shaped cross section which connects an upwardly angled-away flange 29 of the bottom flange 13 to a lower end region or flange 30 of the side sill internal part 10. The connection between the flange 28 of the reinforcing part 14 and the flange 29 of the bottom flange 13 is formed by the above-described flange connection 27 which is produced within the context of the preassembly of the structural unit 15.

In the shell manufacturing, by way of spot welding, the flange 28 of the reinforcing part 14 is then firstly connected to the flange 30 of the side sill internal part 10 to form a flange connection 31 which runs along the direction of longitudinal extent of the side sill 9, that is to say at least substantially horizontally and in the vehicle longitudinal direction (x-direction), and the indirect connection between the bottom flange 13 and the side sill internal part 10 is produced as a result. Secondly, a connection of an upper flange 33 of the reinforcing part 14 to the side sill internal part 10 takes place in the upper region along a flange connection 32 which likewise runs horizontally and in the vehicle longitudinal direction (x-direction).

Furthermore, the side sill external part 41 which is connected by way of an upper flange 45 to a flange 34 of the side sill internal part 10 can be seen in FIG. 7. In a lower outer region of the side sill 9, the side sill external part 41 is connected via a flange 46 to a flange 35 of the bottom flange 13. Accordingly, together with the side sill internal part 10 and the bottom flange 13, the side sill external part 41 delimits the cavity 36 of the side sill 9, within which cavity 36, inter alia, the reinforcing part 14 and the connecting elements 24 between the reinforcing part 14 and the bottom flange 13 are arranged.

In combination with FIGS. 6 and 7, it becomes clear, moreover, in what way the adaptation of the vertical extent in the vehicle vertical direction (z-direction) of the respective connecting elements 24 takes place. Here, the respective joining regions 25, 26 of the respective bulkhead plate 16 and the associated fastening socket 21 can be seen which bear flatly against one another and along which a setting of the bulkhead plates 16 and the associated fastening sockets 21 in their position relative to one another is possible vertically in the vehicle vertical direction (z-direction) and in the vehicle transverse direction (y-direction). This method step takes place, however, within the context of the preassembly of the structural unit 15.

Moreover, it can also be seen clearly in FIGS. 5 and 7 in what way the underfloor energy store 37 for an electric drive of the motor vehicle is fastened to the respective side sill 9. This takes place via respective screws 38 which are screwed into the respective associated threaded hole 39 of the corresponding fastening socket 21.

In order to achieve a positionally precise arrangement of the underfloor energy store 37 relative to the side sill 9, a reference element which can be seen in FIGS. 2b and 2c, in particular a fitting opening 40, for orienting the energy store 37 is provided in the bottom flange 13. Accordingly, this fitting opening 40 is already provided during preassembly of the structural unit 15, with the result that the connecting elements 24 can be oriented thereon, in order to keep corresponding tolerance chains particularly low.

In the present case, the side sill internal part 10 and the bottom flange 13 are formed from different materials, the side sill internal part 10 being formed, in particular, from a high strength or extremely high strength steel, and the bottom flange 13 being formed, in particular, from a steel material which is more ductile in comparison. The side sill internal part 10 can possibly be produced from a galvanized component which is press-hardened with direct warm reshaping.

Figure 8:
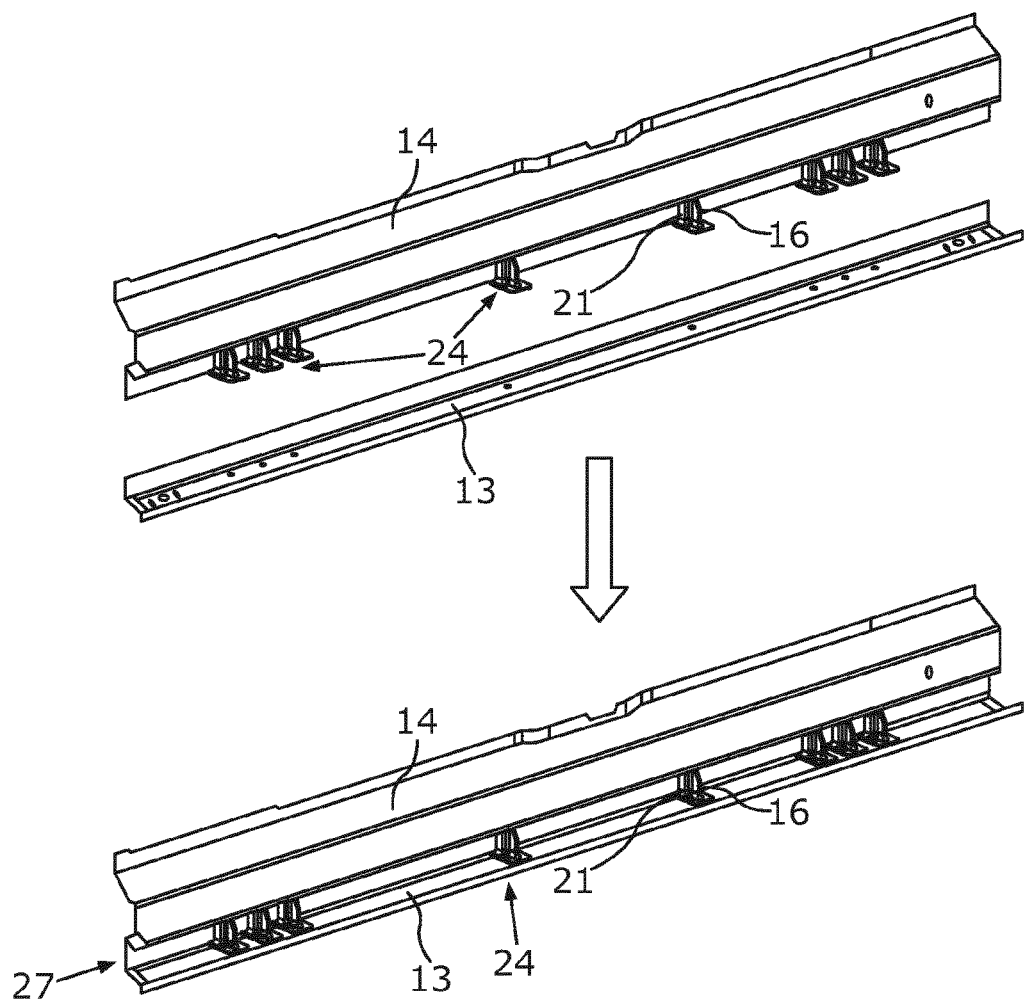
FIG. 8 shows a perspective exploded illustration of the preassembled structural unit in accordance with a further embodiment, in the case of which the height of the respective connecting elements is first of all set, and the respective connecting elements are connected to one another and are connected to the reinforcing part before they are connected to the bottom flange.
Figure 9:
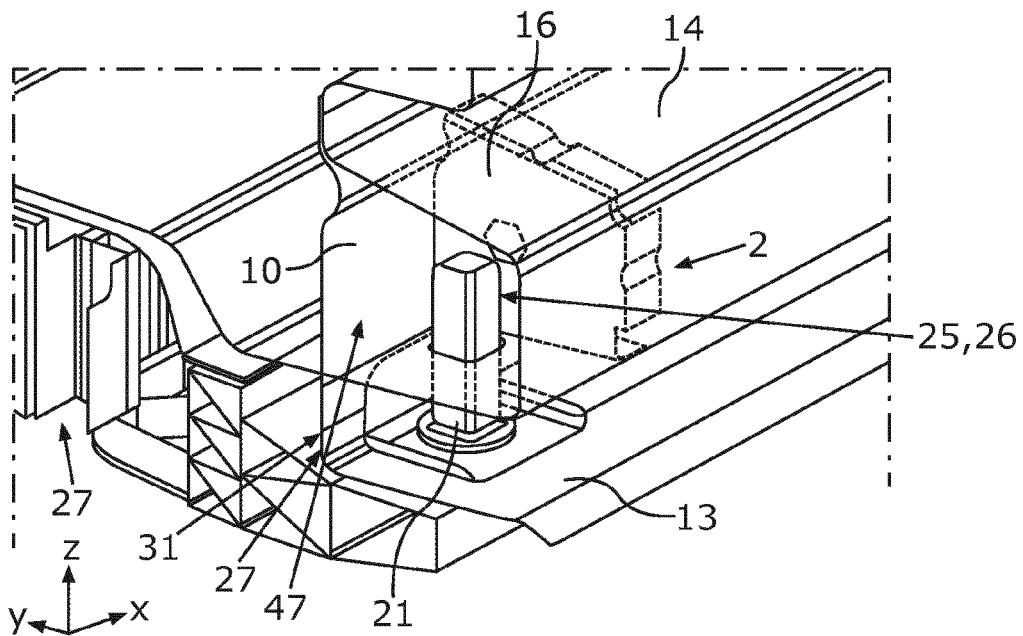
FIG. 9 shows a perspective sectional view of the side sill in an analogous manner with respect to FIG. 5 in an alternative embodiment, in the case of which the respective fastening socket of the energy store penetrates through a lower wall region of the reinforcing part and is connected to an associated bulkhead plate which for its part is arranged within the cavity which is delimited by way of the reinforcing part and the side sill internal part.

FIG. 8 shows a perspective exploded illustration of the preassembled structural unit 15 in accordance with a further embodiment, in the case of which the respective connecting elements 24 (comprising the respective fastening socket 21 and the associated bulkhead plate 16) are first of all set in terms of their height, are connected to one another and are connected to the reinforcing part 14, before they are connected to the bottom flange 13 in the further course. In other words, the fastening sockets 21 and the associated bulkhead plate 16 are therefore oriented mutually at the desired height/position with respect to one another and are joined to one another, and are additionally connected to the reinforcing part 14. Here, the sequence of the method steps can possibly vary. It is thus conceivable to first of all fasten the respective fastening sockets 21 to the reinforcing part 14 and to then perform the orientation and fastening of the associated bulkhead plates 16 to the respective fastening sockets, or else to first of all orient the fastening sockets 21 and the associated bulkhead plates 16 with respect to one another and to connect them to one another, and then to perform the fastening of the connecting elements 24 which are produced in this way to the reinforcing part.

It is essential to the present embodiment of the structural unit 15, however, that the bottom flange is connected to the reinforcing part 14 (via the flange connection 27) or the connecting elements 24 only after the above-described method steps.

FIG. 8 shows a perspective sectional view of the side sill 9 in an analogous manner with respect to FIG. 5 in an alternative embodiment, in the case of which the respective fastening socket 21 of the energy store 37 protrudes through the lower wall region 20 of the reinforcing part 14 and is connected to an associated bulkhead plate 16 which for its part is arranged within the cavity 47 which is delimited by way of the reinforcing part 14 and the side sill internal part 10. In the present case, the respective bulkhead plate 16 and the associated fastening socket 21 also in each case have a joining region 25, 26 which have or are configured as a surface which extends in each case vertically in the vehicle vertical direction (z-direction) and in the vehicle transverse direction (y-direction). Here, their position relative to one another of the respective bulkhead plates 16 and the associated fastening sockets 21, in particular in the vehicle vertical direction (z-direction) but also in the vehicle transverse direction (y-direction), can be set in terms of their relative position along these surfaces or joining regions 25, 26. After this setting operation, joining of the bulkhead plate 16 and the associated fastening socket 21 then takes place, for example, by way of spot welding.

In the present case, these method steps can also take place within the context of the preassembly of the structural unit 15. Here, the bottom flange 13 is once again configured separately from the reinforcing part 14 and is connected to the latter via the flange connection 27. In the present case, the bottom flange 13 is also configured separately from the side sill internal part 10 and is connected to the latter by means of the reinforcing part 14 via the flange connection 31.

Figure 10:
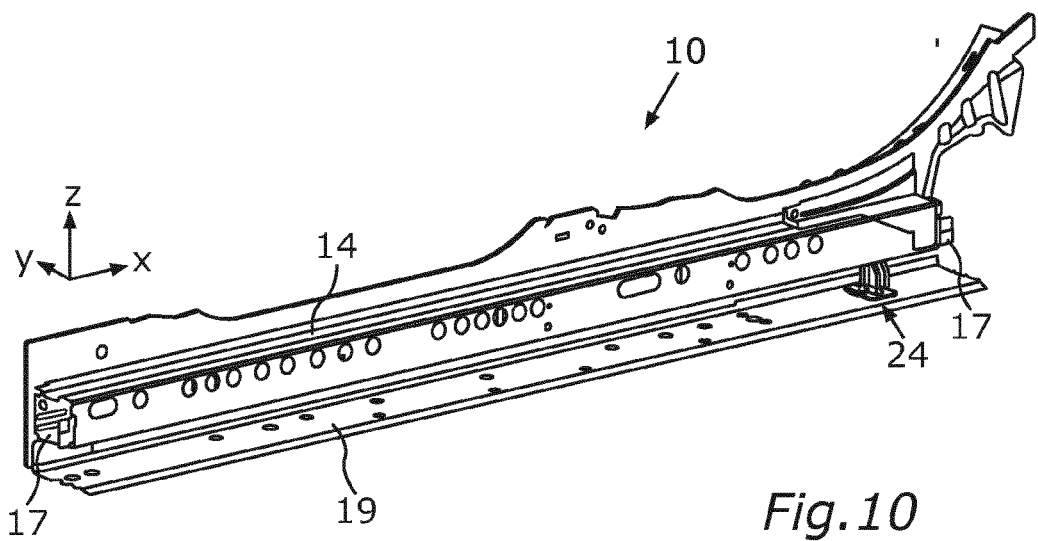
FIG. 10 shows a perspective view of a further, alternative refinement of the side sill, in the case of which a different type of structural unit is provided which can be preassembled, is specific to the design variant, and is used in the case of a passenger motor vehicle which is operated purely by way of fuel, and in the case of which the bottom flange and the reinforcing part are connected to one another merely via one connecting element.

Finally, FIG. 10 shows an alternative refinement of the side sill 9, in the case of which a structural unit 15 of a different type which can be preassembled and is specific to the design variant is provided, which structural unit 15 is used in the case of a passenger motor vehicle which is operated purely by way of fuel. Since connecting elements 24 for attaching the energy store 37 are not required here, all the bulkhead plates 16 and fastening sockets 21 apart from a rear pair are accordingly omitted here, with the result that the bottom flange 13 and the reinforcing part 14 are connected to one another merely via this one connecting element 24. The flange connections between the bottom flange 13 and the reinforcing part 14 (within the context of the preassembly of the structural unit 15) and between the structural unit 15 and the side sill internal part 10 are substantially identical, however, to the above-described embodiments.

Overall, a modular system can therefore be seen, in the case of which the bottom flange 13 or the structural unit 15 can be adapted and preassembled in a simple way in a manner which is specific to the design variant (here, depending on the drive type of the motor vehicle), and can subsequently be connected to the side sill internal part 10 which is universal across design variants, in order to achieve the desired simple, inexpensive and needs-based variation of the overall designs between the different vehicle configurations.

LIST OF DESIGNATIONS

1 Floor assembly
2 Side wall
3 Side wall part
4 Door opening
5 Door opening
6 A-pillar
7 B-pillar
8 C-pillar
9 Side sill
10 Side sill internal part
11 Front wheel arch
12 Rear wheel arch
13 Bottom flange
14 Reinforcing part
15 Structural unit
16 Bulkhead plate
17 Bulkhead plate
19 Wall region
20 Wall region
21 Fastening socket
22 Head
23 Shank
24 Connecting element
25 Joining region
26 Joining region
27 Flange connection
28 Flange
29 Flange
30 Flange
31 Flange connection
32 Flange connection
33 Flange
34 Flange
35 Flange
36 Cavity
37 Energy store
38 Screws
39 Threaded hole
40 Fitting opening
41 Side sill external part
42 Side frame center
43 Arrow
44 Arrow
45 Flange
46 Flange
47 Cavity

What is claimed is:

1. A side sill for a motor vehicle, comprising:
a side sill internal part which is assigned to a floor assembly;
a side sill external part, by way of which a cavity of the side sill is delimited; and
a preassembled structural unit comprising a bottom flange and a reinforcing part, the reinforcing part being arranged in the cavity and being fastened to the side sill internal part, wherein
the side sill internal part is a separate component and is connected to the bottom flange of the structural unit indirectly through the reinforcing part along a flange connection which runs in a direction of a longitudinal extent of the side sill, and the preassembled structural unit is specific to a design variant of the motor vehicle.

2. The side sill according to claim 1, wherein the bottom flange and the reinforcing part are connected to one another via a plurality of connecting elements of the structural unit which is preassembled.

3. The side sill according to claim 2, wherein the connecting elements are configured in two pieces with respective joining regions, along which a height of the connecting elements is set.

4. The side sill according to claim 3, wherein a respective connecting element is formed from a fastening socket for an energy store of the motor vehicle and from a supporting element in the form of a bulkhead plate.

5. The side sill according to claim 2, wherein the bottom flange has a reference element for orienting an energy store.

6. The side sill according to claim 1, wherein the side sill internal part is configured as an identical part which is universal across design variants.

7. The side sill according to claim 1, wherein the side sill internal part and the bottom flange are formed from different materials,
the side sill internal part is formed from a high strength or extremely high strength steel, and
the bottom flange is formed from a material which is more ductile in comparison.

8. The side sill according to claim 1, wherein the side sill internal part is formed from a galvanized component which is press-hardened with direct warm reshaping.

9. A modular system for a side sill of a motor vehicle, with a side sill internal part which is assigned to a floor assembly, with a bottom flange and with a side sill external part, by way of which a cavity of the side sill is delimited, in which a reinforcing part is arranged which is fastened to the side sill internal part, wherein
the modular system comprises the side sill internal part which is universal across design variants and a plurality of bottom flanges which are specific to the design variant, of which the side sill internal part and the associated bottom flange of the respective design variant are configured as separate components and are connectable to one another along a flange connection which runs in the direction of longitudinal extent of the side sill, and
wherein the bottom flange which is specific to the design variant and the reinforcing part are preassembled to form a structural unit which is specific to the design variant.

10. The modular system according to claim 9, wherein the bottom flange which is specific to the design variant and the reinforcing part are preassembled, via a plurality of connecting elements, to form the structural unit which is specific to the design variant.

11. A method for producing a side sill of a motor vehicle, in the case of which method the side sill is formed from a side sill internal part which is assigned to a floor assembly, a bottom flange and a side sill external part, by way of which a cavity of the side sill is delimited, and in the case of which method a reinforcing part is arranged in the cavity, which reinforcing part is fastened to the side sill internal part,
the method comprising:
providing the side sill internal part of a modular system, which side sill internal part is universal across design variants,
providing a bottom flange of the modular system, which bottom flange is specific to the design variant, and
connecting the side sill internal part and the bottom flange to one another at least indirectly in accordance with the respective design variant along a flange connection which runs in the direction of longitudinal extent of the side sill,
wherein the bottom flange which is specific to the design variant and the reinforcing part are preassembled to form a structural unit which is specific to the design variant.

* * * * *